United States Patent
Robbins

(10) Patent No.: US 6,728,167 B1
(45) Date of Patent: Apr. 27, 2004

(54) BACKGROUND MUSIC CONTROLLER

(75) Inventor: Michael S. Robbins, Los Angeles, CA (US)

(73) Assignee: Xantech Corporation, Sylmar, CA (US)

(*) Notice: Subject to any disclaimer, the term of this patent is extended or adjusted under 35 U.S.C. 154(b) by 854 days.

(21) Appl. No.: 09/589,945

(22) Filed: Jun. 7, 2000

(51) Int. Cl.[7] .............................. H04B 1/20; G11B 5/00
(52) U.S. Cl. .......................... 369/2; 369/4; 369/30.08; 360/12; 381/119
(58) Field of Search ............................ 369/2–5, 19–20, 369/30.05, 30.19, 30.23, 83, 30.06, 178.01, 30.08, 30.07; 360/12, 60, 72.3, 72.2, 98.04; 381/119, 107, 109, 58; 348/565

(56) References Cited

U.S. PATENT DOCUMENTS

| | | | |
|---|---|---|---|
| 3,825,947 A | 7/1974 | Rubin et al. | 360/12 |
| 3,889,290 A | 6/1975 | Seaton | 360/12 |
| 4,070,698 A | 1/1978 | Curtis et al. | 369/3 |
| 4,636,880 A | 1/1987 | Debell | 360/72.3 |
| 4,918,531 A * | 4/1990 | Johnson | 348/565 |
| 5,168,481 A * | 12/1992 | Culbertson et al. | 369/2 |
| 5,465,240 A * | 11/1995 | Mankovitz | 369/1 |
| 6,426,922 B1 * | 7/2002 | Machida et al. | 369/2 |
| 6,434,242 B2 * | 8/2002 | Yamada et al. | 381/119 |

* cited by examiner

Primary Examiner—Ali Neyzari
(74) Attorney, Agent, or Firm—Hogan & Hartson L.L.P.

(57) ABSTRACT

A device that controls background music interspersed with commercial messages by using an unmodified Compact Disc (CD) player loaded with custom discs. The custom discs provide the music and commercial content, and inform the device of the rate at which the commercial messages should interrupt the music. Dual Tone Multi Frequency (DTMF) signals are employed to provide control signals to the device to inform it of the disc type, track end, and rate of interspersion of commercial messages. The CD player is controlled by either a wired or wireless remote.

19 Claims, 6 Drawing Sheets

Fig. 4

| HEX | f1 | f2 |
|---|---|---|
| 0 | 941 | 1633 |
| 1 | 697 | 1209 |
| 2 | 697 | 1336 |
| 3 | 697 | 1477 |
| 4 | 770 | 1209 |
| 5 | 770 | 1336 |
| 6 | 770 | 1477 |
| 7 | 852 | 1209 |
| 8 | 852 | 1336 |
| 9 | 852 | 1477 |
| A | 941 | 1336 |
| B | 941 | 1209 |
| C | 941 | 1477 |
| D | 697 | 1633 |
| E | 770 | 1633 |
| F | 852 | 1633 |

BACKGROUND MUSIC CONTROLLER

BACKGROUND OF THE INVENTION

1. Field of the Invention

The present invention relates to audio playback devices that provide background music, and more specifically to a device that provides background music interspersed with commercial messages for retail establishments.

2. Background Information

For many years, retail establishments have been using background music as a means to increase sales, provide a more pleasant shopping experience, stimulate customer loyalty and to encourage repeat visits by customers. In addition to the background music, many retail establishments also periodically broadcast commercial messages to promote products, advise customers of sales and special events, indicate hours of operation, and to thank customers for their patronage.

Typically the background music comes from a source such as a radio, cassette player or CD player. More sophisticated systems deliver music programs via cable or satellite hookup. Often commercial messages are interspersed with the background music by the use of a separate device. Rubin et al (U.S. Pat. No. 3,825,947), Seaton (U.S. Pat. No. 3,889,290), Curtis et al (U.S. Pat. No. 4,070,698) and Debell (U.S. Pat. No. 4,636,880) describe cassette tape devices of this nature. All of these known devices require custom-designed playback units with their own tape mechanisms. Such an approach is not very economical since such non-standard custom-designed devices are by nature quite costly. Furthermore, cost is further increased in that two separate devices are required, one to reproduce background music and one to intersperse the commercials.

Another aspect of the known devices is that these systems typically require user intervention to insure proper operation of the device. The user may be required to manually adjust the amount of time between commercial messages (Curtis et al, Debell, and Rubin), or to setup a background music source (Seaton, Curtis et al, Debell, and Rubin).

It would therefore be clearly advantageous to create a device that would allow the use of a single, off-the-shelf playback device to reproduce both music and commercial messages.

It would also be advantageous to create a system which employs a simple, reliable means to control the broadcast of music and commercials with minimal user intervention.

OBJECTS AND SUMMARY OF THE INVENTION

It is therefore an object of the present invention to provide a background music controller which provides background music interspersed with commercial messages that uses a single, commercially available means of audio reproduction.

It is a further object of the present invention to provide a background music/commercial message system that requires minimal user intervention to control the music, commercial content, and rate of interruption of the music.

It is yet another object of the present invention to enable the recorded media to control the music, commercial content and rate of interruption of the music.

It is still another object of the present invention to prevent playback of unauthorized media.

It is still a further object of the present invention to overcome the disadvantages of known background music systems.

In accordance with one form of the present invention, a background music controller provides background music interspersed with commercial messages by using an unmodified Compact Disc (CD) player loaded with custom discs. The custom discs provide the music and commercial content, and inform the controller of the rate at which the commercial messages should interrupt the music.

The controller reads audio tone codes recorded on one channel of the custom discs that provide control data, and controls the reproduction of monaural music or commercial messages recorded on the other channel of the custom disc. The CD player is controlled by sending remote control codes to the player via its remote input connector or, in the absence of such a connector, by sending the codes as infrared impulses to an infrared sensor on the player.

A further advantage of this approach is that unauthorized discs can be readily identified, allowing the device to prevent playback of unauthorized media.

BRIEF DESCRIPTION OF THE DRAWINGS

FIG. 4 is a table of hexadecimal values associated with the DTMF tones encoded on the compact discs used in the present invention.

DETAILED DESCRIPTION OF THE PREFERRED EMBODIMENTS

Figure 1:
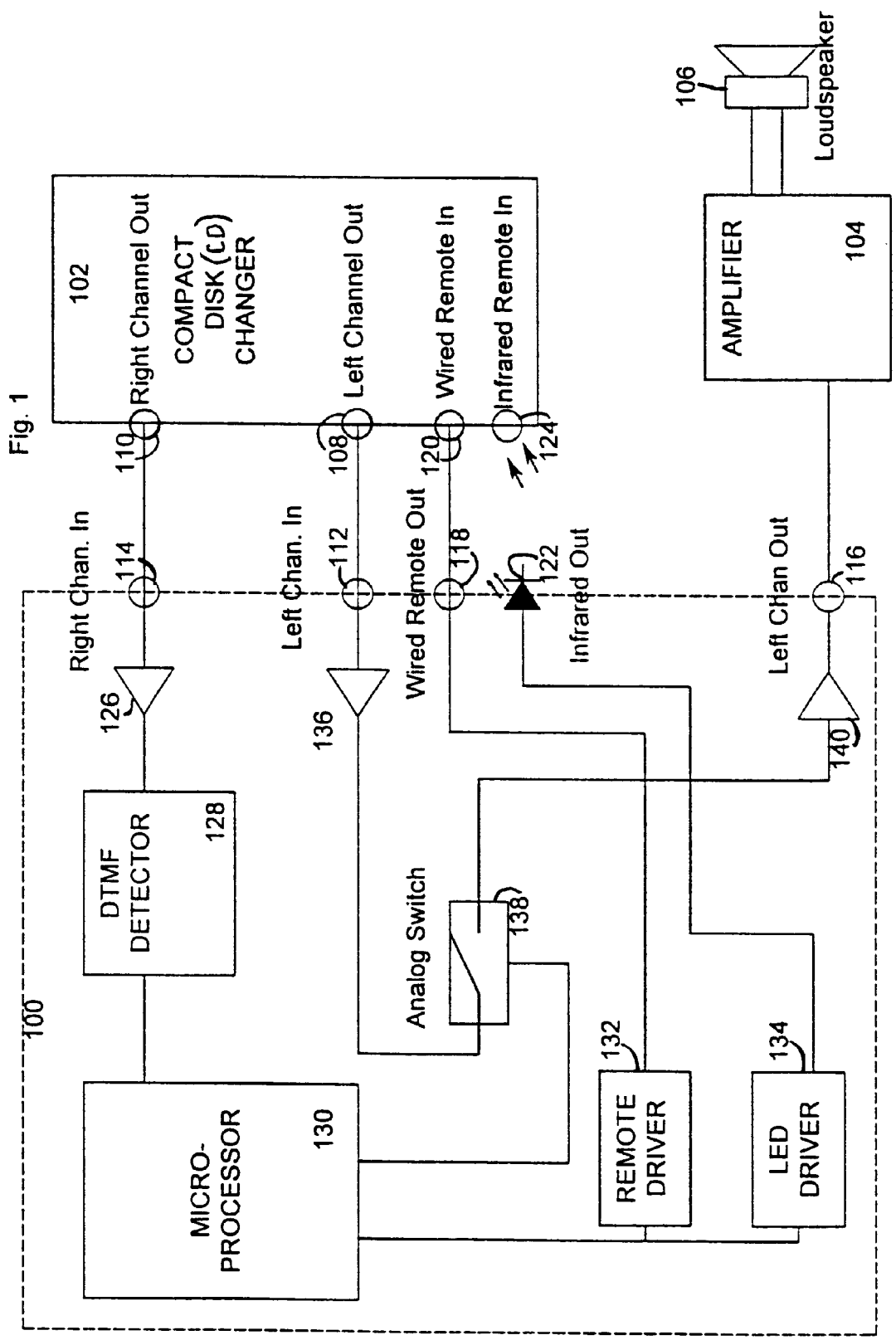
FIG. 1 is a block diagram of the present invention.

Referring initially to FIG. 1, the present invention which provides background music interspersed with commercial messages in, for example, retail establishments will now be described. The present invention includes background music controller (device) 100, an off-the-shelf multi-disc CD changer 102 (such as Model PD-M426 sold by Pioneer Electronics), an audio amplifier 104, and a loudspeaker 106 of conventional type. These components are interconnected in the manner shown in FIG. 1 which is described below.

The device 100 includes a right channel input port 114, left channel input port 112, wired remote output port 118, infrared output port 122 and left channel output port 116. The right channel input port 114 is coupled to the input of an amplifier 126. The output of the amplifier 126 is coupled to the input of a DTMF detector 128. The output of the DTMF detector 128 is coupled to microprocessor 130, which is coupled to and provides control signals to an analog switch 138, a remote driver 132 and LED driver 134.

The left channel input port 112 of device 100 is coupled to the input of a buffer amplifier 136. The output of the buffer amplifier is coupled to an input of analog switch 138. Analog switch 138 is switched under the control of microprocessor 130.

The output of the analog switch is coupled to an amplifier 140 whose output is provided to left channel output port 116. The outputs of remote driver 132 and LED driver 134 are respectively coupled to the wired remote output port 118 and infrared output port 122.

The CD changer 102 preferably includes a right channel output port 110, left channel output port 108, wired remote input port 120 and infrared remote input port 124. The right channel output port 110 of CD changer 102 operatively communicates with right channel input port 114. The left channel output port 108 of CD changer 102 preferably operatively communicates with left channel input port 112. Wired remote input port 120 of CD changer 102 operatively communicates with wired remote output port 118, and infrared remote input port 124 operatively communicates with infrared output port 122.

Operatively coupled to left channel output port 116 is amplifier 104 for receiving and amplifying left channel output signals and providing same to load speaker 106 for output as sound.

As explained above, signals from the compact disc (CD) changer's left channel output port 108 and right channel output port 110 are connected to the left channel input port 112 and right channel input port 114. The left channel output port 116 is connected to the audio amplifier 104 that drives one or more loudspeakers 106.

Device 100 enacts control of the CD changer 102 in one of two ways, either by directly wiring the wired remote output port 118 to the wired remote input port 120 of the CD changer 102, or by emitting an infrared signal via the infrared output port 122 directed at the infrared remote input port 124 of the CD changer 102.

The present invention operates by having special codes recorded on the right channel of custom commercial and music discs as DTMF bursts. These DTMF codes control the reproduction of monaural music or commercial messages recorded on the left channel of the discs. The right track signal enters the device via the right channel input port 114 to amplifier 126. The output of the amplifier 126 is provided to the input of a DTMF detector integrated circuit 128. The DTMF detector 128 detects the presence of any of the sixteen possible DTMF bursts (shown, e.g., in FIG. 4), decodes the DTMF code, and forwards the information to the microprocessor 130.

The microprocessor 130, under the control of a software program described hereinbelow, controls the CD changer 102 with a wired remote control or an infrared signal. Wired remote control signals from the microprocessor 130 drive the wired remote output 118 via the remote driver 132. Infrared control signals are generated at the infrared output 122 via LED driver 134. In either case, the microprocessor 130 generates a serial signal according to the specified format of the CD changer 102. This serial signal contains common CD commands such as Play, Stop, Seek Track, Select Disc, etc. Although there are differences in the serial data format for different manufacturers' CD changers, these variations can be accommodated by minor changes to the software program.

Monaural audio recorded on the music or commercial discs enters the device 100 via the left channel input port 112. The audio signal passes through buffer amplifier 136, and is provided to analog switch 138. Analog switch 138 is controlled by the microprocessor 130. During normal audio playback, microprocessor 130 sets the analog switch 138 in its closed state, allowing audio signals to pass through amplifier 140, proceeding to the amplifier 104 and loudspeaker 106 via the left channel output port 116. However, when it is necessary to prevent audio playback, such as when the device 100 is initially reading the encoded right track data, or if no custom-encoded discs are detected, the microprocessor 130 sets the analog switch 138 to its open state (as shown in FIG. 1). This prevents the audio signal from reaching the amplifier 104.

Figure 2:
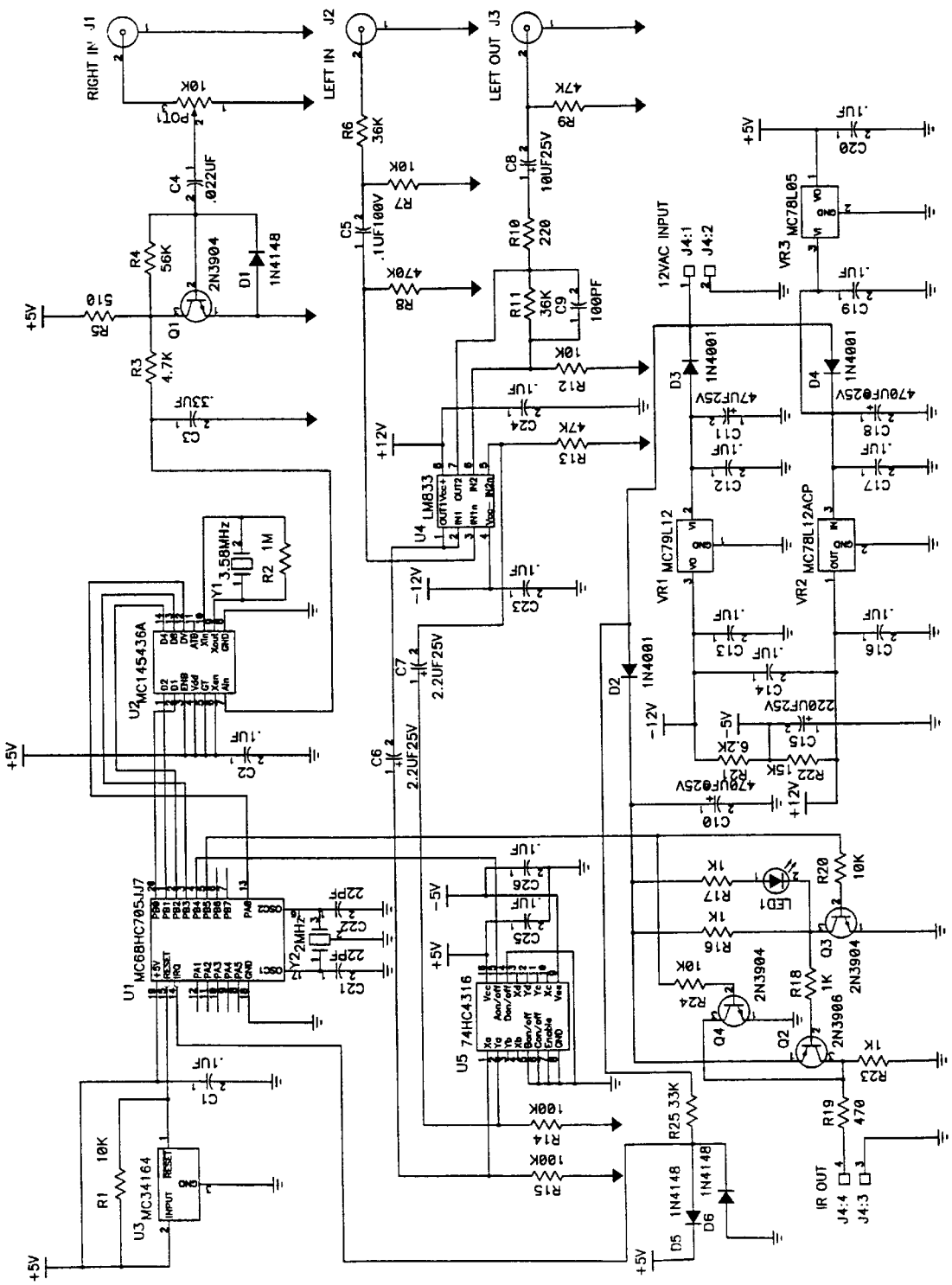
FIG. 2 is a schematic diagram of the preferred embodiment of the present invention.

FIG. 2 is a detailed schematic of a preferred embodiment of the background music controller (device) 100. The signal from the right channel output port 110 of the CD changer 102 is provided to the device at J1 (upper right of FIG. 2). The signal then passes through potentiometer POT1, which is set to adjust the incoming signal to a proper level. The signal is AC coupled via capacitor C4 to the amplifier which includes transistor Q1, resistor R4 and resistor R5. Diode D1 which is coupled between capacitor C4 and ground potential provides a needed discharge path for capacitor C4. The amplified signal passes through a low pass filter which includes resistor R3 and capacitor C3 before being provided to the input of DTMF decoder U2.

In the preferred embodiment U2 is a Motorola MC145436A DTMF Decoder. The decoder accepts signals at its Ain pin (bottom left of the chip), and if a valid DTMF tone pair is detected, the decoder alerts the microprocessor with its DV (data valid) pin. A four-bit binary coded representation of the detected digit is output to the microprocessor U1 through pins D8, D4, D2 and D1. Crystal Y1 and resistor R2 form an oscillator circuit that provides decoder U2 with a stable 3.58 megahertz frequency reference.

In the preferred embodiment, microprocessor U1 is a Motorola MC68HC705JJ7 eight bit microprocessor. The microprocessor controls the operation of the device 100 with a software program embedded in its internal program memory. The microprocessor interfaces with three other devices, specifically the DTMF decoder U2, analog switch U5, and remote control driver circuitry which includes Q2, Q3 and Q4. The interface is made with U1's Input/Output (I/O) ports.

Microprocessor U1 monitors the status of the DTMF decoder U2 by checking its data valid input connected to U1 I/O port PAo. When this input signal becomes active, a valid DTMF tone has been detected on the data track. To determine the code associated with the tone, the microprocessor U1 reads the DTMF decoder U2 pins D8, D4, D2 and D1 on its I/O ports PB3, PB2, PB1, and PB0 respectively. These four bits of data form a single hexadecimal digit corresponding to the frequency pair detected as shown in the table of FIG. 4.

Analog switch U5 is controlled by microprocessor U1 by simply setting the state of its PB4 output port. This causes the switch between the Xa and Ya pins of U5 to be open or closed under microprocessor control.

Microprocessor U1 also generates the necessary signals to provide remote control of the CD changer 102. Following the format required by the manufacturer of the, CD changer 102, the microprocessor U1 emits a serial data signal from its I/O port PB5. This signal drives transistor Q3, which drives an indicator light emitting diode LED1 that provides a visual indication of a signal output to the CD changer 102. If the CD changer 102 uses wireless control, resistor R18 and transistor Q2 are installed in the device to drive an infrared emitter for wireless control via the IR Out connector J4. If the CD changer 102 uses a wired remote control, transistor Q4 and resistor R24 are installed to drive a wired output via the same J4 connector.

Associated with microprocessor U1 are an oscillator circuit which includes crystal Y2 and capacitors C21, C22, which provides a stable reference clock, and a reset circuit which includes resistor R1 and reset integrated circuit U3, which ensures that a proper reset signal is applied to microprocessor U1 when power is initially applied to the device 100. Additionally, diodes D5, D6 and resistor R25 provide microprocessor U1 with a reference clock signal derived from the AC power supply input J4. This reference signal (typically 60 hertz in North America), coupled to the interrupt request (IRQ) input of the microprocessor U1, provides a signal that is asynchronous with the microprocessor clock. This is useful for the generation of random numbers to create a randomly generated playlist.

Audio signals from the left track of the music or commercial CDs enter the device 100 through the left input connector J2 (middle right side of FIG. 2). Resistors R6 and R7 form a resistor divider that scales the incoming signal to a level that is within the allowable input range of subsequent circuitry, while maintaining the required input impedance of approximately 50K ohms. Capacitor C5 and resistor R8 form a high pass filter to block any DC signal.

The audio signals are then provided to a portion of amplifier U4 which is configured as a non-inverting, unity gain buffer. The output of this buffer amplifier is coupled to analog switch U5 via the high pass filter which includes capacitor C6 and resistor R15.

As mentioned previously, the microprocessor (130) U1 can enable or disable playback of CD audio through its control of analog switch (138) U5. To enable the playback signal, the microprocessor U1 causes the analog switch U5 to close, allowing the audio signal to pass from the Xa pin to the Ya pin. Conversely, opening the switch will prevent audio signals from being provided to the Ya pin.

Signals which appear at the analog switch output pass through a high pass filter which includes resistor R14, capacitor C7 and resistor R13. Next the signal is presented to a portion of amplifier U4 that is configured as a non-inverting amplifier so as to counteract the effect of the R6/R7 resistor divider and restore the signal to its original level. The output of this portion of amplifier U4 is passed through a high pass filter which includes R10, C8 and R9 before arriving at the left channel output connector J3.

Power is supplied to the device 100 by a 12 volt AC power supply connected to J4 (bottom right of FIG. 2). Diode D2 and capacitor C10 provide an unregulated power supply for the remote control circuitry. Diode D3 and capacitors C11 and C12 provide a negative unregulated supply for −12 volt regulator VR1, which provides a regulated −12 volt power supply. The −5 volt power supply is derived from the −12 and +12 volt power supplies by the resistor divider which includes R21 and R22 and capacitor C15. Diode D4 and capacitors C17, C18, and C19 provide a positive unregulated supply for voltage regulators VR2 and VR3. VR2 provides a +12 volt supply, while VR3 provides a +5 volt supply.

Figure 3:
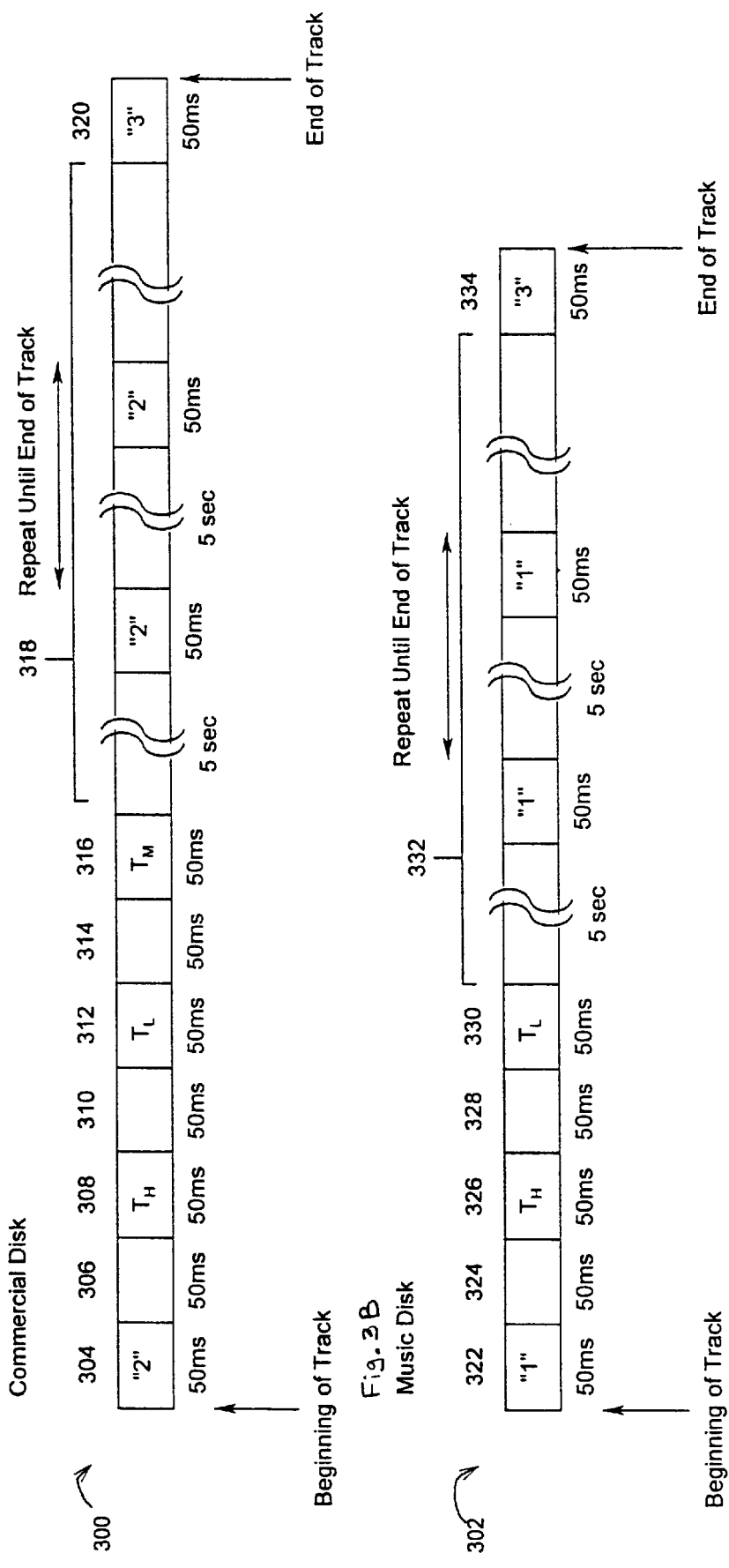
FIG. 3A shows the arrangement of tones recorded on data tracks of a commercial disc used in the present invention.
FIG. 3B shows the arrangement of tones recorded on data tracks of a music disc used in the present invention.

FIGS. 3A and 3B show the format of the data track of a commercial disc 300 and the data track of a music disc 302. Referring initially to FIG. 3A, at the beginning of a commercial disc 300, a 50 ms burst of a DTMF "2" code 304 is recorded, followed by 50 ms of silence 306. This identifies the disc as a commercial disc 300. Following this, two 50 ms bursts, $T_H$ 308 and $T_L$ 312, each followed by 50 ms of silence, 310 and 314, are recorded. These two bursts represent a two digit hexadecimal number that indicates the total number of commercial tracks recorded on the disc 300. Next, a single DTMF burst, $T_M$ 316, is recorded that represents the number of music tracks to be played between each commercial track. After this, a DTMF "2" 318 is recorded every five seconds until the end of the track. As long as the device 100 continues to see the DTMF "2", it can continue playback of the track. At the point corresponding to the end of the monaurally recorded audio on the commercial track, a DTMF "3" 320 is recorded on the data track.

FIG. 3B shows the format of the data track for music discs 302. It is the same as the format of the commercial disc 300, except that the identifying code is a DTMF "1" 322 instead of "2", and there is no provision for recording the number of music tracks between commercials, $T_M$. Accordingly, following the identifying code 322 are two 50 ms bursts, $T_H$ 326 and $T_L$ 330, interspersed by 50 ms of silence, 324 and 328, are recorded. These two bursts represent a two digit hexadecimal number that indicates the total number of music tracks recorded on the disc 302. After this, a DTMF "2" 332 is recorded every five seconds until the end of the track. As long as the device 100 continues to see the DTMF "2", it can continue playback of the track. At the point corresponding to the end of the monaurally recorded audio on the music track, a DTMF "3" 334 is recorded on the data track.

In addition to providing the device with needed data about a disc, this arrangement allows the device to have two significant capabilities. First, it can identify the presence of an off-the-shelf compact disc, when a period of greater than five seconds of playback pass with no DTMF tone detected. Since the device 100 is intended to only allow playback of authorized discs that are encoded in one of the above formats, it must be able to identify them. Secondly, it allows the device to know when a track has ended. This information is also necessary for the device to properly perform its function, since at the end of a given track, it must cue the next music or commercial track.

FIG. 4 is a table containing the hexadecimal code assignments for all of the sixteen DTMF tone pairs used in the system. As can be seen from the table, each hexadecimal code has a unique tone pair associated with it.

Figure 5A:
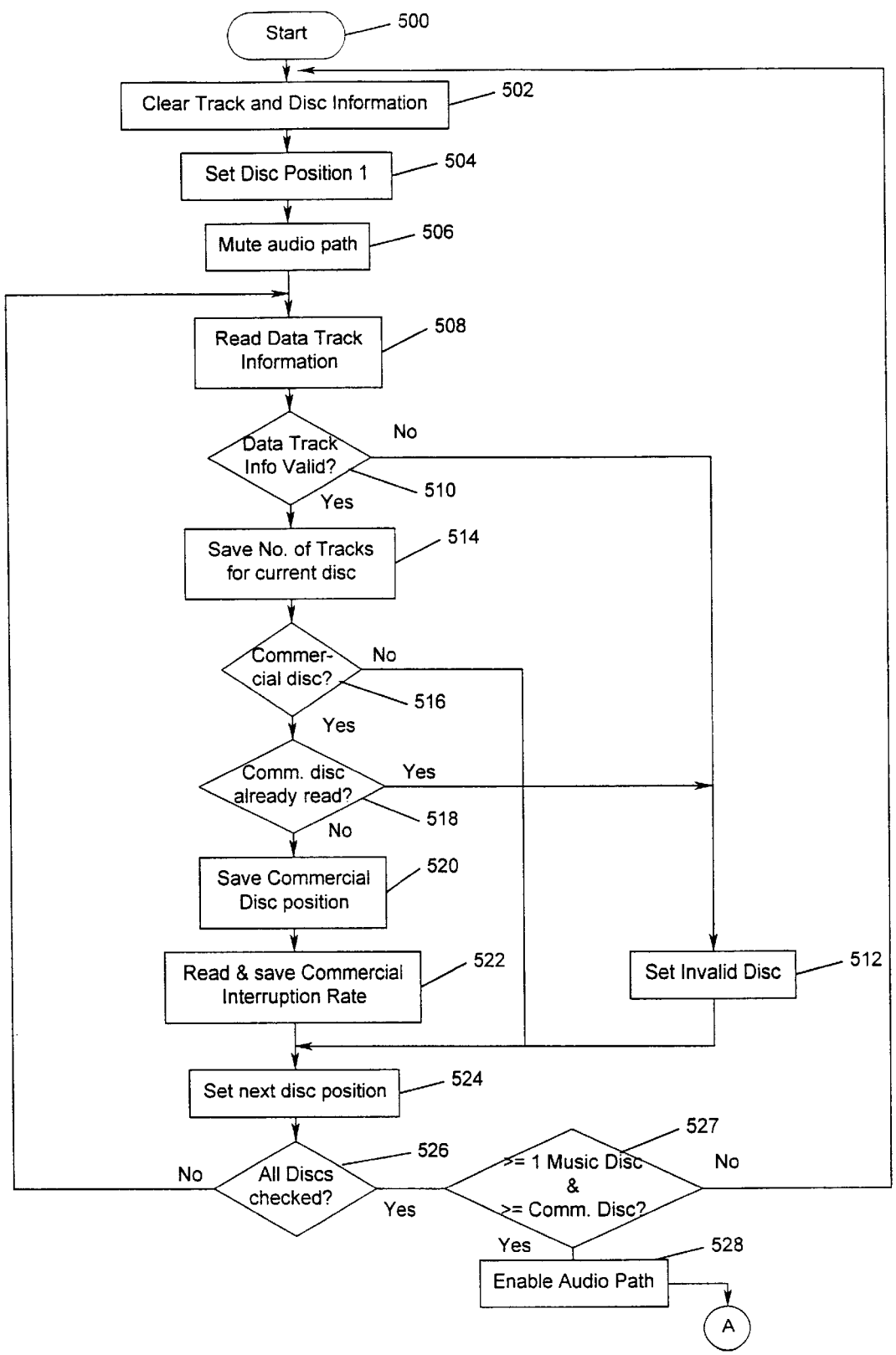
FIGS. 5A and 5B are flowcharts of the operation of the microprocessor shown in FIGS. 1 and 2.
Figure 5B:
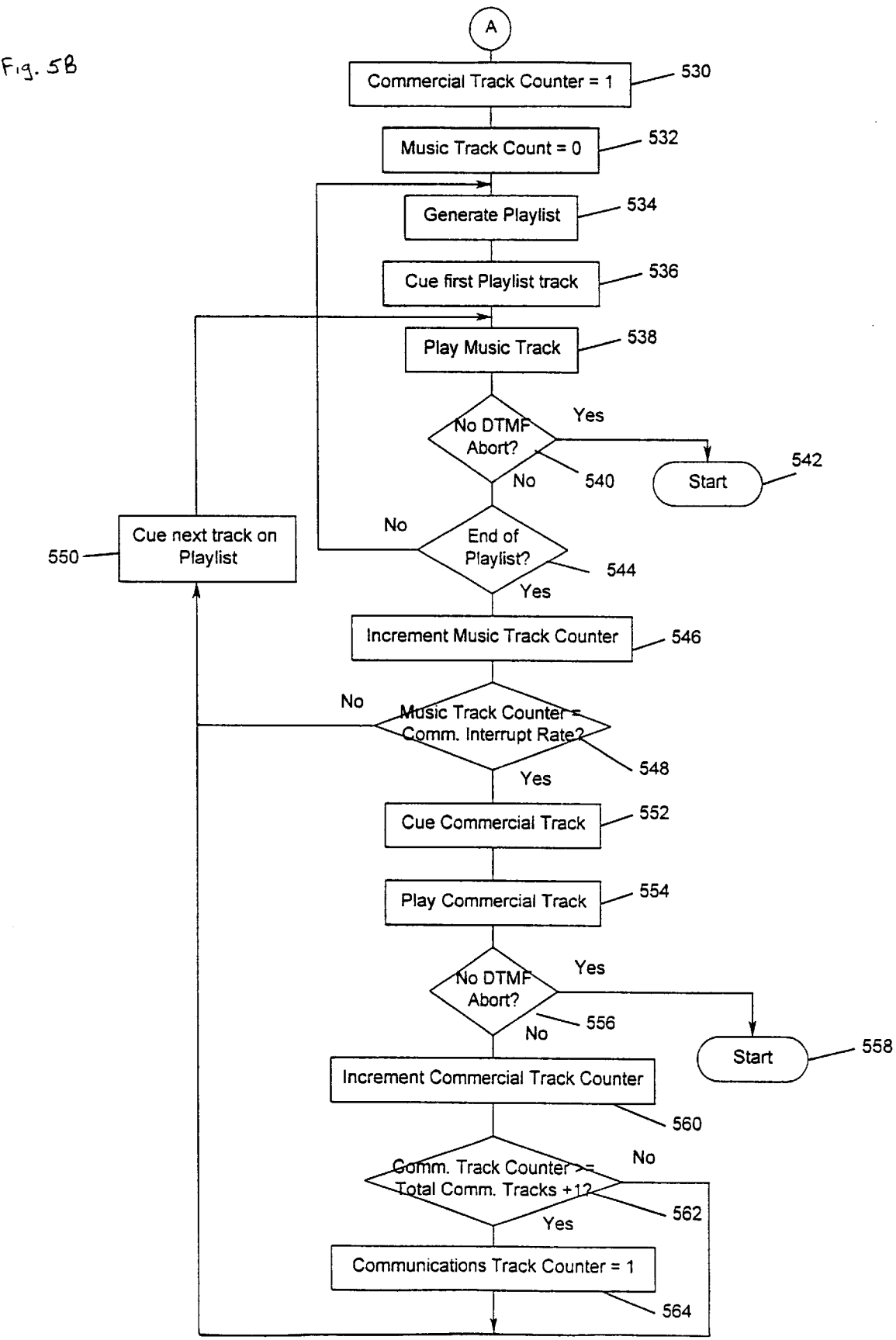

FIGS. 5A and 5B are a flowchart of the operation of the microprocessor (130 of FIG. 1 and U1 of FIG. 2) that controls the device 100. When the program starts at step 500, information is read from all of the discs loaded in the multi-disc CD changer 102. Before starting this process, all track and disc information is cleared from memory in anticipation of the new data at step 502. Next, a command is sent at step 504 to the CD changer 102 to set the disc at the first position. Finally, step 506 opens the analog switch 138 to mute the audio path, so that audio track information is not heard while the device is reading information from the disc.

Next, the operation enters a loop where the disc at each position in the multi-disc CD changer 102 is examined in turn.

The first step 508 of the loop causes the device to start playback of the disc and read the data track information. Next, at step 510, if the data is not valid, the disc is either not installed or is not an authorized one, and the disc is marked as invalid at step 512 before the program proceeds to the end of the loop. If the data is valid, indicating that the disc is authorized, the program proceeds to step 514, where the total number of tracks read for this disc is saved. Note that a separate storage area inside the microprocessor (100 in FIG. 1 or U1 in FIG. 2) is maintained for each disc in the CD changer 102. For example, a first memory area would contain the information for the first disc in the changer, a second memory area would contain the information for the second disc, and so on.

Next, the data track information is checked to see what type of disc is installed at the current position at step 516. If the disc is a music disc, then the program skips to step 524 at the bottom of the loop. If it is a commercial disc, the program checks to see if a commercial disc has been read at a previous disc position at step 518. If so, this previous disc is given precedence, the disc is marked as invalid at step 512, and the program skips to the second currently read commercial end of the loop at step 524.

If a commercial disc has not yet been read, the program proceeds to step 520, where the current disc position of the CD changer 102 is marked as the commercial disc position. The device 100 must remember this position so the device can return to the commercial disc when it is time for a commercial message to be played. Additionally, the commercial interruption rate is saved at step 522, so the system can determine how many music tracks should be played before playing a commercial message.

Next, at step 524, the CD changer 102 is commanded to change to the next disc position. According to the subsequent step 526, if all discs have not yet been checked, the program returns to the beginning of the loop at step 508 to read data from the next disc. If all discs have been checked, the process of reading the data from each disc is complete, and the program proceeds to the next task.

In order to proceed with playback music and commercial messages, at least one commercial and one music disc must be present in the CD changer 102. Step 527 tests for this. If these conditions are not met, the program restarts at step 500.

Otherwise, the method proceeds to step 528, wherein the process of playing the discs begins. First, the analog switch 138 is closed which enables the audio path. Next, at step 530, the commercial track counter is initialized to 1. This counter is used to reset to the first commercial message after all messages have been played. Subsequently, at step 532, the music track count, which counts the number of music tracks played since the last commercial, is initialized to zero.

Thereafter, the program generates a playlist at step 534, which indicates the sequence in which the music tracks are to be played. The playlist can be generated in many ways, from a simple sequential playback of all valid music discs to a random playback. Next, the CD changer 102 is commanded to cue the track corresponding to the beginning of the playlist at step 536.

At step 538, the first step of the playback loop, the CD changer 102 plays the current music track. The result of this playback is evaluated at step 540. If playback is aborted due to no DTMF codes detected on the data channel, then either a disc has been removed, or a playback error has occurred. In this case, the program proceeds to step 542 to re-initialize the system.

Otherwise, if playback of the track concluded successfully, and at step 544 the end of the playlist has been reached, the program loops back to step 534 to generate a new playlist. If the end of the playlist has not yet been reached, the music track counter is incremented and checked at step 546. If, at step 548, the music track counter has not reached the commercial interruption rate, the CD changer 102 is commanded to cue the next track on the playlist at step 550, and the program loops to play this next music track at step 538.

If the music track counter reaches the commercial interruption rate, it is time to play a commercial track. First, at step 552, the next commercial track (based on the commercial track counter) is cued and then the CD changer 102 is commanded to play it back at step 554. The result of this playback is evaluated at step 556. If playback is aborted due to no DTMF codes detected on the data channel, either a disc has been removed, or a playback error has occurred. In this case, the program proceeds to step 558 to re-initialize the system.

If playback of the commercial track concludes normally, the commercial track counter is incremented at step 560 and checked at step 562. If the incremented result exceeds the total commercial tracks, then all of the commercial tracks have been played, and the communication track counter is set to one at step 564. Then the program proceeds to step 550 to cue and play the next music track from the playlist.

Although illustrative embodiments of the present invention have been described herein with reference to the accompanying drawings, it is understood that the invention is not limited to those precise embodiments and that various changes and modifications may be effected therein by one with ordinary skill in the art.

What is claimed is:

1. Apparatus for controlling playback of audio signals from an external audio signal playback device having first and second channels, comprising:
    a playback monitor coupled to the first channel of the external audio signal playback device;
    a controller coupled to said playback monitoring means;
    a remote interface device coupled to said control means and to a control input of the external audio signal playback device;
    wherein said control means controls the external audio signal playback device via said remote interface means to generate an audible program interspersed with commercial messages on the second channel.

2. The apparatus as defined by claim 1, wherein said remote interface device comprises an infrared remote control device.

3. The apparatus as defined by claim 1, wherein said remote interface device comprises a wired remote control device.

4. The apparatus as defined by claim 1, wherein said playback monitoring device comprises a detector which detects control signals contained on said first channel.

5. The apparatus as defined by claim 4, wherein said detector is a Dual Tone Multi Frequency (DTMF) detector.

6. The apparatus as defined by claim 4, wherein said control signals identify a signal segment on said second channel as either a commercial message or an audible program.

7. The apparatus as defined by claim 4, wherein said control signals identify an end of a segment of audible signals on said second channel.

8. The apparatus as defined by claim 4, wherein said control signals identify the rate of interspersion of said commercial messages between segments of said audible program.

9. The apparatus as defined by claim 4, wherein said controller prevents further playback of segments of audible signals on said second channel when said control signals are not detected.

10. The apparatus as defined by claim 1, further comprising a switch operatively coupled to said second channel, said switch being controlled by said controller, wherein said controller employs said switch to disable said second channel of said audio signal playback device while monitoring said control signals on said first channel of said audio signal playback device.

11. Apparatus for playback of audio signals comprising:
    a playback device for playback of the audio signals;
    media for use with said playback device, said media containing both audio signals and control signals;
    a detector which detects said control signals on said media;
    a controller coupled to said playback device and said detector, said controller controlling said playback device to play said audio signals according to said control signals detected by said detector.

12. The apparatus as defined by claim 11, wherein said media is a Compact Disc (CD).

13. The apparatus as defined by claim 11, wherein said control signals are recorded on a first channel of said media, and said audio signals for playback are recorded on a second channel of said media.

14. The apparatus as defined by claim 11, wherein said control signals identify a segment of said audio signals as either a commercial message or an audible program.

15. The apparatus as defined by claim 14, wherein said controller controls said playback means to play said audible program interspersed with said commercial messages.

16. The apparatus as defined by claim 15, wherein said control signals further identify the rate of interspersion of said commercial messages between segments of said audio program.

17. A method for providing an audio program interspersed with commercial messages comprising the steps of:
   identifying segments of a signal as either an audio signal or commercial message signal by decoding first audible control signals;
   determining an interspersion rate of said commercial message signal by decoding second audible control signals, and
   playing back said audio signal interspersed with said commercial message-according to said interspersion rate.

18. The method as defined by claim 17 wherein the step of identifying segments of audio signals as audio signals or commercial message signals comprises the steps of:
   monitoring a channel of a playback device;
   decoding dual tone multi frequency signals recorded on said channel;
   associating a first dual tone multi frequency code with an audio program segment; and
   associating a second dual tone multi frequency code with a commercial message segment.

19. The method as defined by claim 17 wherein the step of playing back said audio signal interspersed with said commercial messages according to said interspersion rate comprises the steps of:
   generating a playlist of a number of available audio program segments;
   repetitively cuing and playing a quantity of audio program segments according to said playlist, until the quantity of audio program segments played correspond to said interspersion rate;
   cuing and playing at least one commercial message; and
   repeating playback until the playlist is exhausted.

* * * * *